J. K. McGUIRE.
CAR DOOR BRACKET.
APPLICATION FILED FEB. 8, 1909.
943,039.
Patented Dec. 14, 1909.
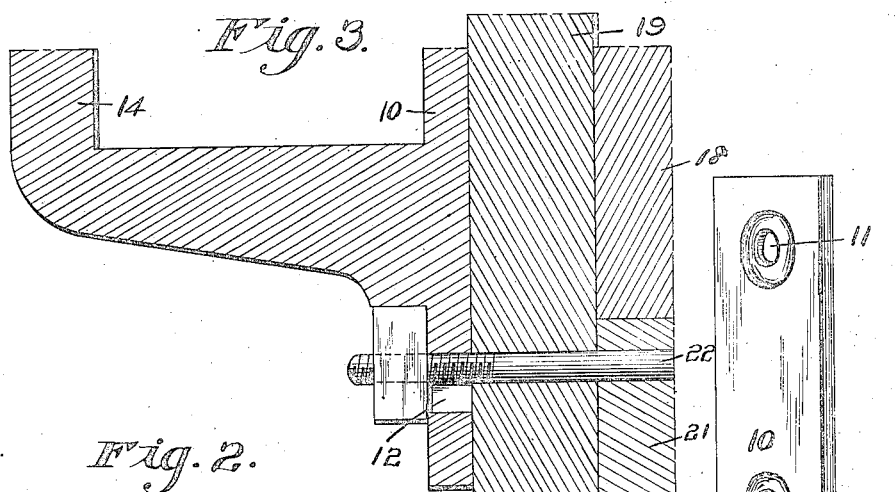
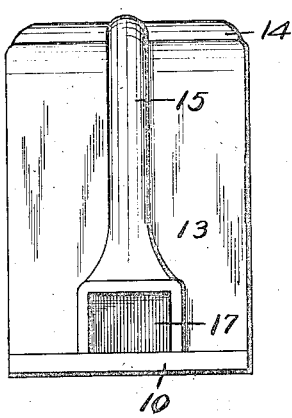
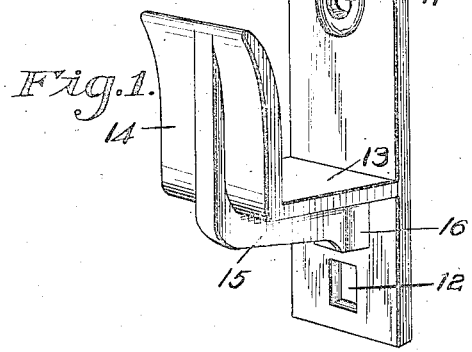
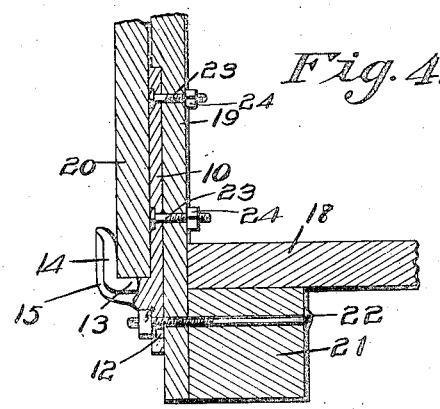
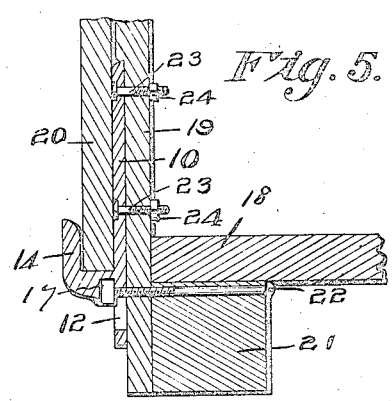
Witnesses.
F. C. Dahlberg.
A. G. Hague
Inventor:
J. K. McGuire.
by Orwig & Lane attys

UNITED STATES PATENT OFFICE.

JOSEPH K. McGUIRE, OF VALLEY JUNCTION, IOWA, ASSIGNOR OF ONE-HALF TO E. R. BIERCE, OF VALLEY JUNCTION, IOWA.

CAR-DOOR BRACKET.

943,039.  Specification of Letters Patent.  Patented Dec. 14, 1909.

Application filed February 8, 1909. Serial No. 476,604.

*To all whom it may concern:*

Be it known that I, JOSEPH K. MCGUIRE, a citizen of the United States, residing at Valley Junction, in the county of Polk and State of Iowa, have invented a certain new and useful Car-Door Bracket, of which the following is a specification.

The object of my invention is to provide a car door bracket of the kind designed for use in connection with freight cars for the purpose of limiting the outward movement of the lower portion of the door relative to the car and to be used in connection with car doors that slide longitudinally.

More specifically, it is my object to provide a device of this kind of simple, durable and inexpensive construction, in which the bracket is so constructed and arranged that it may be bolted to the car in such a manner that, after it is secured in place, none of the bolts may be removed by persons on the outside of the car, to thereby avoid the possibility of removing the brackets and then swinging the lower portion of the door outwardly to provide access to the interior of the car without breaking the car door seal.

My invention consists in the construction, arrangement and combination of the various parts of the device, whereby the objects contemplated are attained, as hereinafter more fully set forth, pointed out in my claims, and illustrated in the accompanying drawings, in which—

Figure 1 shows a perspective view of the device embodying my invention detached from the car. Fig. 2 shows an inverted, plan view of same. Fig. 3 shows an enlarged, detail sectional view illustrating the lower portion of the bracket and the lower bolt in position relative thereto, showing the nut thereon locked. Fig. 4 shows a vertical sectional view of a portion of a car and a car door and my improved bracket applied thereto, and—Fig. 5 shows a similar view illustrating a slight modification.

Referring to the accompanying drawings, I have used the reference numeral 10 to indicate the body of the bracket which is preferably flat and rectangular in outline, and which is provided at its upper portion with one or more counter-sunk bolt holes 11. Near its lower end is a vertically arranged slot 12. This part of the bracket is designed to be secured to the side of the car by means of bolts, as will be hereinafter described.

The part of the bracket that is designed to prevent downward movement of a car door comprises a horizontally arranged portion 13 extended outwardly from the part 10 at a point above the slot 12 and an upwardly and outwardly projecting portion 14. The parts 13 and 14 are braced and reinforced by means of a rib 15. The lower portion of said rib has a flat end at 16 arranged a short distance above the slot 12.

In the modified form of the device illustrated in Figs. 2 and 5, I have formed in the inner end of the rib 15, a rectangular nut recess 17, as clearly illustrated in Fig. 2. The slot in the modified form is extended upwardly somewhat farther than in the form shown in Fig. 1, so that a bolt may be passed through it with the nut on the end of the bolt resting in the nut recess 17, as clearly shown in Fig. 5.

The reference numeral 18 is used to indicate the floor of a car, 19 the car side, and 20 the car door. Below the floor 18 is a longitudinal supporting timber 21. This car structure is of the ordinary kind now in common use and of itself forms no part of my present invention.

One of the important features of my invention is the arrangement of the means for fastening same to a car. This means comprises a bolt 22 having a rounded head and extended through the part 21 and the portion of the car side, the rounded head being on the inner face of the part 21. The screw threaded end of the bolt is extended through the slot 12 and the bracket is first placed in position with the bolt 22 at the bottom of the slot 12. Then a nut is placed on the bolt and is turned until it engages the bracket. This may easily be done because the part 16 will be spaced apart above the nut so long as the bracket is in position with the bolt at the bottom of the slot 12. When the nut has been firmly screwed to position with one of its edges substantially parallel with the part 16, then the operator bodily moves the bracket downwardly until the part 16 engages the top of the nut, as clearly shown in Figs. 3 and 4. This, obviously, will prevent the nut from being unscrewed until the bracket is first bodily elevated. In order to prevent the bracket from being elevated and to firmly and securely support its upper end, I extend one or more bolts 23 through the openings 11 in the bracket and through the car side, as clearly shown in Fig. 4, and place nuts 24 on the ends thereof inside of the car where they can not be reached by persons on the outside of the car. By this arrangement, it is obvious that after a bracket is thus secured to a car, it can not be removed, nor can its lower end be swung outwardly from the car for the reason that the lower bolt firmly holds the lower end of the bracket against outward movement, and the nut on said bolt can not be unscrewed until the bracket is bodily elevated and the bracket can not be bodily elevated on account of the bolts 23 which are accessible only to a person on the inside of the car.

In the modified form shown in Figs. 2 and 5, the slot 12 is made slightly longer and the inner end of the rib 15 is provided with a nut recess 17. When the bracket is moved downwardly, the entire nut is contained within the nut recess and, therefore, it can not be reached for the purpose of turning it, or for breaking it from the bolts after unscrewing it, nor can a person get access to the nut and the end of the bolt for the purpose of breaking it off as might possibly be done with the form shown in Figs. 3 and 4.

I claim as my invention.

1. An improved car door bracket, comprising a body portion having a slot in its lower end portion, a part extended outwardly and upwardly from the body, said part being formed with a nut engaging shoulder thereon above and close to said slot, a bolt to extend through the slot, a nut thereon to engage said shoulders, and means for securing the body portion against upward movement.

2. An improved car door bracket, comprising a body portion having an integral part extended outwardly and then upwardly therefrom, said part being provided with a nut engaging shoulder having a recess formed therein at its base, said body portion being also provided with a slot below the nut engaging portion, and means for securing the body portion against upward movement.

3. A device of the class described, comprising a body portion having an integral part extended outwardly and then upwardly upwardly, said body portion having a slot near its lower end and a bolt opening in its upper portion, a nut engaging shoulder arranged above said slot, a bolt passed through the slot, a nut thereon in engagement with said nut engaging shoulder, and a bolt passed through the bolt opening in the upper portion of the body portion, and a nut thereon, for the purposes stated.

4. A device of the class described, comprising a body portion having an integral part thereof extended outwardly and then upwardly, said body portion having a slot near its lower end and a bolt opening in its upper portion, a nut engaging shoulder arranged above said slot having a recess formed therein at its base, a bolt passed through the slot, a nut thereon in engagement with said nut engaging shoulder, a bolt passed through the bolt opening in the upper portion of the body portion, and a nut thereon, for the purposes stated.

Des Moines, Iowa, January 27, 1909.

JOSEPH K. McGUIRE.

Witnesses:
  RALPH ORWIG,
  M. B. GOLDIZEN.